April 3, 1962 W. DITEL 3,027,960
AUTOMOBILE HAVING FOUR DRIVEN WHEELS
Filed March 21, 1960 3 Sheets-Sheet 1

INVENTOR:
WUKOL DITEL
BY
Peter S. Tailor
Agent

April 3, 1962  W. DITEL  3,027,960
AUTOMOBILE HAVING FOUR DRIVEN WHEELS
Filed March 21, 1960  3 Sheets-Sheet 2

*INVENTOR:*
WUKOL DITEL

April 3, 1962 W. DITEL 3,027,960
AUTOMOBILE HAVING FOUR DRIVEN WHEELS
Filed March 21, 1960 3 Sheets-Sheet 3
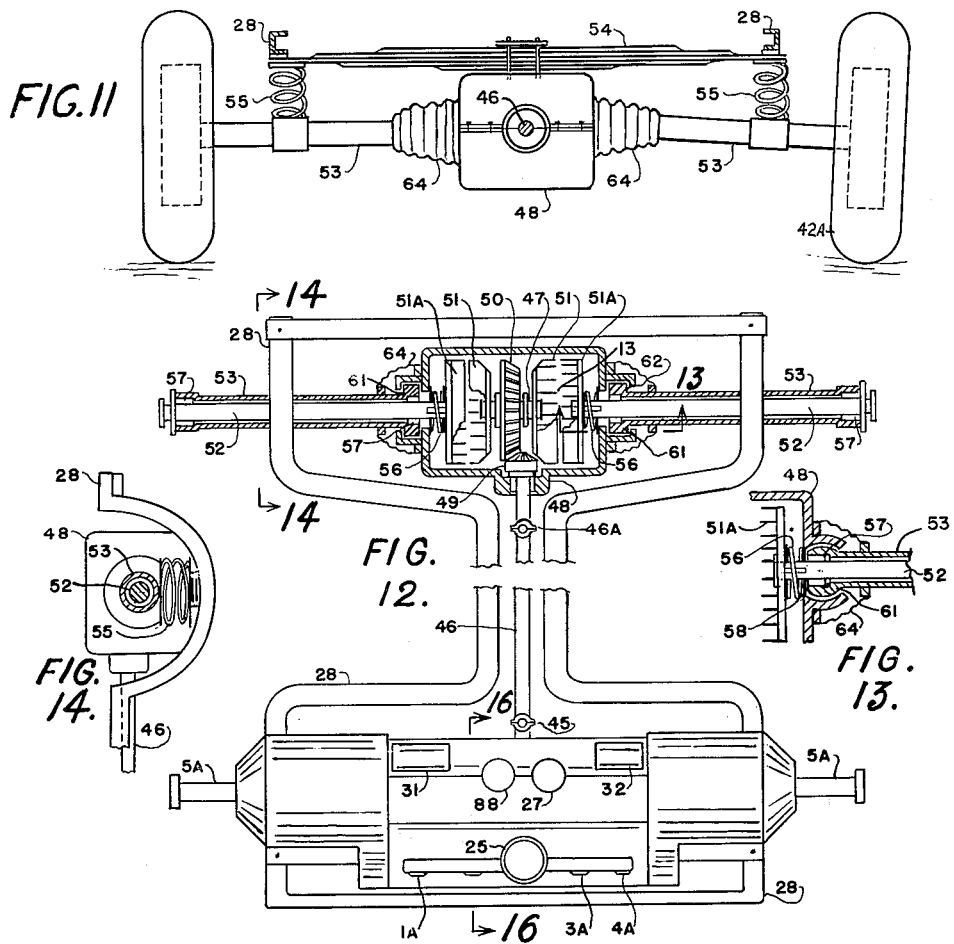
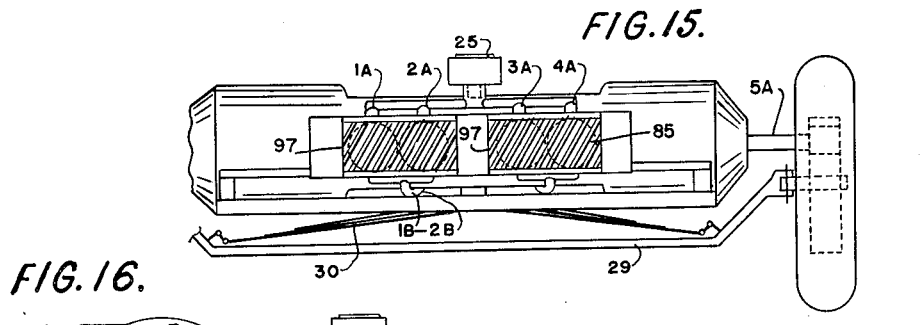
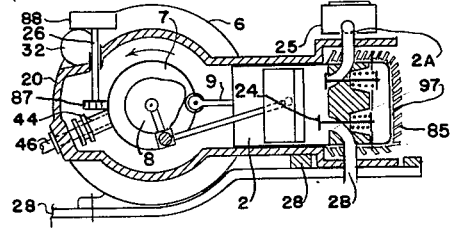
INVENTOR:
WUKOL DITEL

United States Patent Office 3,027,960
Patented Apr. 3, 1962

3,027,960
AUTOMOBILE HAVING FOUR DRIVEN WHEELS
Wukol Ditel, 357 S. 5th St., Brooklyn, N.Y.
Filed Mar. 21, 1960, Ser. No. 16,435
8 Claims. (Cl. 180—44)

This invention relates in general to automobile construction, and, more particularly, it relates to the unified construction of an automobile engine, suspension, and four wheel drive.

An object of this invention is to provide several improvements in basic automobile and engine structures, which, when used together in the construction of an automobile, will result in a more rugged, a less expensive, and a better performing automobile.

Another object of this invention is to provide an automobile engine which may be mounted across the frame of an automobile with drive units secured to each end of the crank shaft of the automobile engine to drive the automobile wheels which are disposed adjacent to the ends of the automobile engine and to provide a centrally located power takeoff from the center of the crankshaft to drive additional wheels of the vehicle.

Still another object of this invention is to provide an automobile engine which is simpler in its construction in that it is a four cycle gasoline engine which requires no additional cam shaft rotating at one-half the speed of the crankshaft.

Yet another object of this invention is to provide an automobile engine valve actuating mechanism which requires two distinct strokes in order to actuate each valve.

A further object of this invention is to provide a unique suspension for a relatively heavy engine or transmission unit which drives the wheels of a motor vehicle.

An additional object of this invention is to provide, without undue loss of efficiency, four separate fluid drive units for the four wheels of an automobile.

Many additional objects, advantages and features of invention reside in the construction, arrangement and combination of parts involved in the embodiment of the invention as will be understood from the following description and accompanying drawings wherein FIG. 1 is a horizontal section taken through the automobile engine with one end and one driven wheel broken away;

FIG. 11 is an elevational view of a fluid drive unit and two driven wheels suspended from the frame of an automobile;

FIG. 12 is a top view of a frame of a motor vehicle with the motor mounted transversely across one end of the frame, with a four wheel drive fluid transmission unit shown in section mounted across the other end of the frame and with the center portion of the frame broken away;

FIG. 13 is a section taken on line 13—13 of FIG. 12;

FIG. 14 is a section taken on line 14—14 of FIG. 12;

FIG. 15 is an end view of the motor vehicle showing the motor mounted across the frame with one end of the motor and one driven wheel broken away; and FIG. 16 is a section taken on line 16—16 of FIG. 12.

Figure 1:
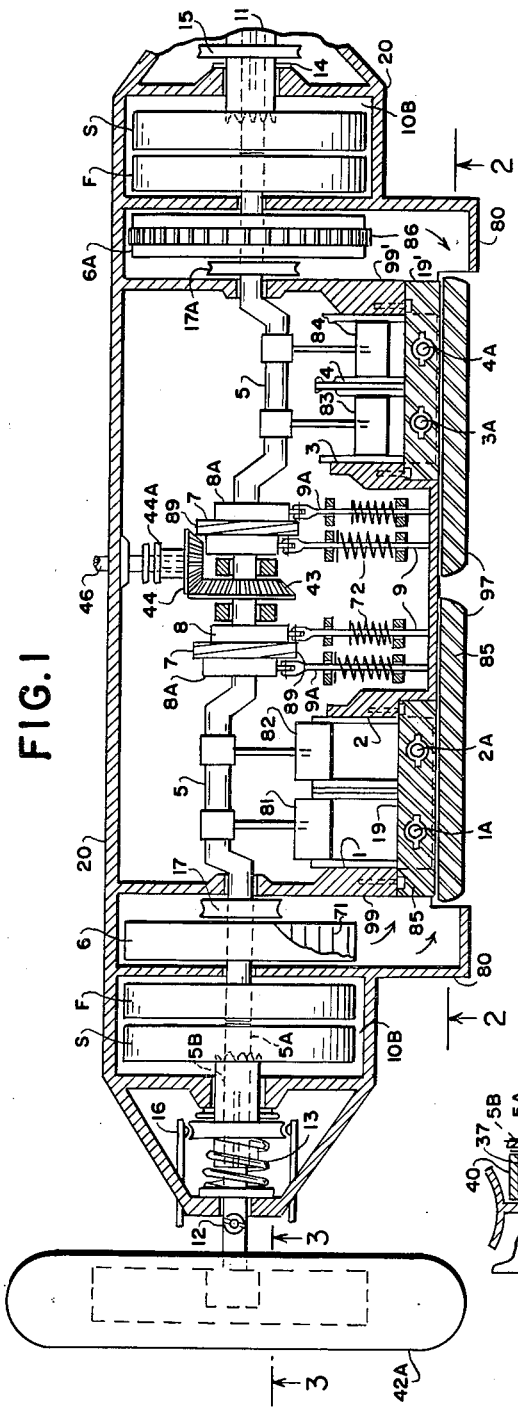
Figure 2:
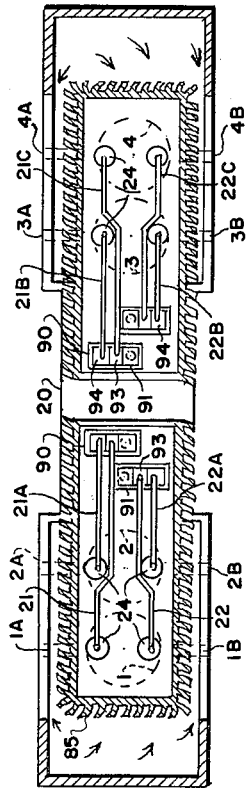
FIG. 2 is a vertical section taken on line 2—2 of FIG. 1.

Referring to the drawings in detail, my improved automobile engine operates as follows. As shown in FIGS. 1 and 2, the engine crankcase 20 is mounted across the frame of the automobile with the cylinders 1, 2, 3, and 4 extending horizontally forward from it. Bolted over the cylinder blocks 99 and 99' are the two cylinder heads 19 and 19'. Valve covers 97 are secured over the cylinder heads. Extending through the crankcase 20 is the crankshaft 5 which is suitably journaled in transverse bulkheads or other supports extending from the outer walls of the crank case 20. For reasons of simplicity in construction and to reduce cost to a minimum, crankshaft 5 has two throws which are disposed 180° apart. The pistons 81 and 82, which reciprocate within cylinders 1 and 2, are attached to one throw by means of conventional connecting rods while the pistons 83 and 84 which reciprocate within cylinders 3 and 4 are likewise connected to the other throw of the crankshaft 5 with conventional connecting rods.

Figure 4:
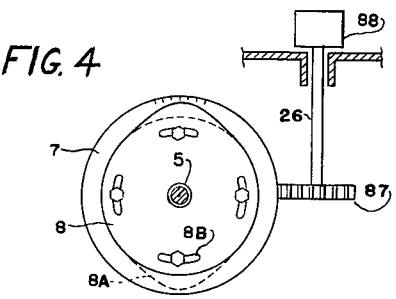
FIG. 4 is a side view of a disk mounted on the crankshaft adjustably carrying the valve actuating cams and driving the ignition distributing system.
Figure 5:
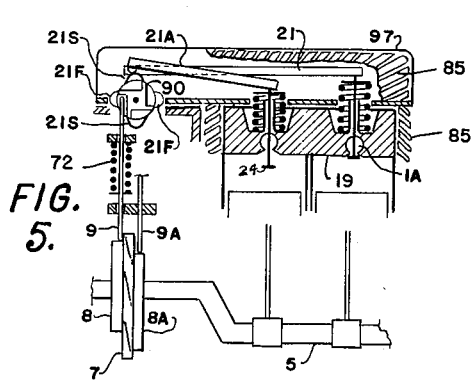
FIG. 5 is a longitudinal section through one end of the engine showing the mechanism whereby cams which rotate with the crankshaft activate the valves.
Figure 6:
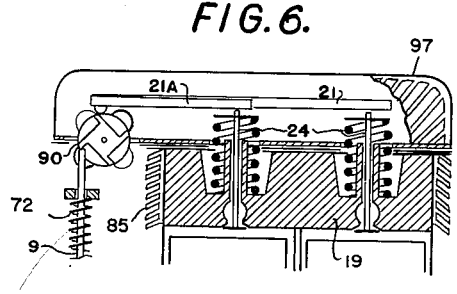
FIGS. 6 and 7 are longitudinal sections through the cylinder heads on one side of the engine further showing the operation of the valve actuating mechanism.
Figure 7:
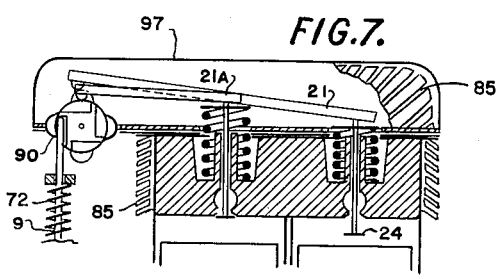
Figure 8A:
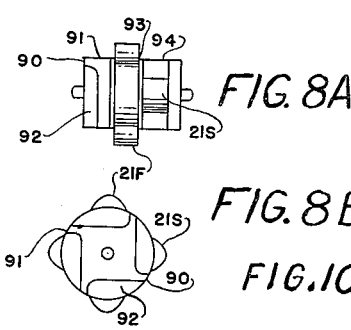
FIG. 8A is a side view of the rocker arm actuating cam.
Figure 8B:
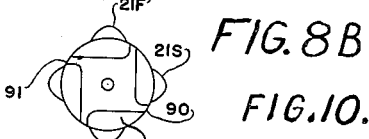
FIG. 8B is an end view of the rocker arm actuating cam.

Fixed to the outwardly disposed ends of the crankshaft 5 are the two flywheels 6 and 6–A which carry vanes 71 to direct a blast of cooling air toward the cylinders. The flywheel 6–A carries a conventional ring gear 86 which may be engaged by the conventional starting motor 32 as shown in FIG. 12. Extended walls 80 of the crankcase 20 extend about the cylinders and the cylinder heads to direct the blast of cooling air on them. The cylinder blocks 99 and 99', the cylinder heads 19 and 19' and the covers 97 carry the cooling fins 85 which are formed integrally with them. Intake and exhaust apertures 1–A, 2–A, 3–A, 4–A, 1–B, 2–B, 3–B and 4–B communicate with the cylinders. Valves 24 as shown in FIG. 2, block these intake and exhaust apertures and they are activated by the rocker arms 21, 21–A, 21–B, 21–C, 22, 22–A, 22–B and 22–C. As shown in FIGS. 5, 6 and 7, the valves 24 are conventional valves such as may be found in any valve-in-head engine. They are held in a seated position by a compression spring and are opened when the valve stems are moved downwards by a rocker arm. In FIGS. 5, 6 and 7, the rocker arms 21 and 21–A are shown alone without the centrally located pivot which would be required on each arm and without the necessary support structure for such a pivot as such structures are standard and well known. Referring again to FIG. 1 and to FIG. 4, two disks 7 are rigidly fixed to the crankshaft 5. The outer surfaces of these disks 7 may have cut in them the worm teeth 89. As shown in FIG. 4, these worm teeth may drive a worm gear 87 which, by means of the shaft 26, will turn the distributor rotor 88. Bolted on each side of each disk 7 are the two cam plates 8 and 8–A. These cam plates are identical except that one cam plate has a single projection extending in one direction and the other cam plate has a single projection extending in the opposite direction. The cam plates 8 and 8–A are secured to the disks 7 by means of bolts which pass through arcuate slots 8–B. This allows the cam plates 8 and 8–A to be rotated or turned relative to the crankshaft to time the engine.

Referring again to FIG. 1, a single spring loaded push rod 9 or 9–A bears against each cam disk 8 or 8–A.

These push rods are urged by springs 72 against the cam disks 8 and 8–A on which they make a roller contact. Referring now to FIGS. 5, 6, 7, 8A and 8B, these push rods 9 and 9–A actuate the rocker arms 21 and 21–A which are shown as well as the rocker arms 22, 22–A, 21–B, 21–C, 22–B and 22–C in the following manner. Since my engine is a four cycle engine, two revolutions of the crankshaft should take place before each actuation of a given valve. This result is accomplished without the use of or need for a timing chain and a cam shaft. As seen in FIG. 6, both valves 24 are closed. At the appropriate time, a cam disk 8 or 8–A will urge the push rod 9 upward. Rotatably disposed above each push rod 9 or 9–A there is a single timing cam 90. Each timing cam 90 consists of three parts. The first part is the push rod engaging end 91 which contains the four cuts 92. An intermediate portion 93 of the timing cam carries two projections 21–F, while the end portion 94 of the timing cam carries the two projections 21–S. The projections 21–F and the projections 21–S are disposed at 90° to each other. As the push rod 9 moves upward in FIG. 6, it engages a cut in portion 91 of the timing cam and rotates it through at least 45° to the position shown in FIG. 7. In this position shown in FIG. 7, either one of the projections 21–F or 21–S will contact the rear end of a rocker arm to open a valve against its spring. When the push rod 9 then moves downward, the downward force exerted on the timing cam by the rocker arm will be applied to one side of a projection 21–F or 21–S past its top dead center to cause the timing cam to rotate through another 45° to allow the open valve to close. Since, as shown in FIG. 2, there are four timing cams 90 each actuating the intake or exhaust valves of adjacent pairs of cylinders, each timing cam 90 will activate either two intake or two exhaust valves.

Each cam disk 8 activates a rod 9 and each cam disk 8–A activates a rod 9–A. Rod 9 engages a timing cam 90 which opens two intake valves 24 and rod 9–A engages another timing cam 90 which opens two exhaust valves 24. Since an intake valve 24 in a given cylinder must open after the piston in the cylinder has started down in the cylinder and since an exhaust valve 24 must open when the piston has just started to move up in the cylinder, the crankshaft 5 must turn through 180° between the opening of an exhaust valve 24 and the opening of an intake valve 24 in a given cylinder. Thus, as shown in FIG. 4, the cam disks 8 and 8–A, which respectively activate either intake or exhaust valves, have their throws disposed 180° apart.

Since the cam disks 8 and 8–A are directly mounted on the crankshaft 5, each revolution of the crankshaft 5 activates the push rods 9 and 9–A which then each rotate a timing cam 90 through 90°. Since a given valve 24 will only be opened when a timing cam 90 rotates through 180°, two revolutions must be made by the crankshaft 5 and the cam disks 8 and 8–A to open any given valve 24. When a cam disk 8 revolves through 360°, it activates a rod 9 to rotate a timing cam 90 through 90° to open one intake valve 24. As the cam disk 8 rotates through another 360°, it again activates rod 9 to rotate the timing cam 90 through another 90° to open the other intake valve 24 on an adjacent cylinder. Thus the adjacent pairs of cylinders at each end of the engine fire 360° apart. Since the throws of the crankshaft 5 are disposed 180° apart, the smoothest possible firing order for this engine is 1, 3, 2, 4.

Figure 10:
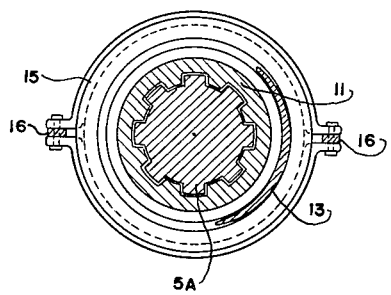
FIG. 10 is a section taken on line 10—10 of FIG. 9.
Figure 9:
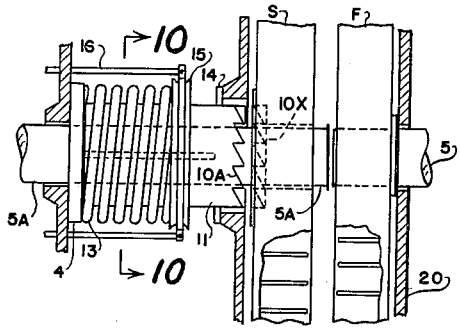
FIG. 9 is a horizontal section through a fragment of one end of the automobile engine showing a fluid drive unit and a drive shaft disengaging unit.

Referring again to FIG. 1, a bevel gear 43 is mounted in the center of the crankshaft 5 so that it may drive the shaft 46 by means of the bevel gear 44 which is slidably secured to the shaft 46. Thus, by means of a yoke (not shown) which may engage the collar 44–A of the bevel gear 44, the shaft 46 may be driven by the crankshaft 5. This centrally located power take-off which extends at right angles to the axis of the motor is a particularly desirable feature when the motor is used to drive a four wheel drive vehicle. The pulleys 17 and 17–A which are fixed to the crankshaft inside the flywheels 6 and 6–A may be used to drive a generator or other optional equipment. Each end of the crankshaft 5 extends into a closed fluid drive unit casing 10–B. Attached to the ends of the crankshaft 5 are the fluid drive impellers F. Driven by the impellers F are the impellers S whose structure is shown in detail in FIGS. 9 and 10. The impeller S is mounted to freely rotate about a shaft 5–A. A portion of shaft 5–A is splined and has slidably mounted about it engaged with the splines of the shaft 5–A a larger connecting shaft 11. The end of the connecting shaft 11, which is disposed toward the impeller S, terminates in the serrations 10–A. Corresponding serrations 10X are formed on the outside face of the impeller S so that they may be engaged by the serrations 10–A on the shaft 11 and drive it. A compression spring 13 bears against an extension of the crankcase 20 at each end of the motor to urge a thrust bearing 15 mounted on the shaft 11 inwards. The other end of this compression spring 13 rests against the thrust bearing 4. Therefore, as seen in FIG. 9, the spring 13 urges the shaft 11 inwards so that it will contact the driven impeller S and be rotated thereby to rotate the shaft 5–A. Rods 16 extend from the control mechanism (not shown) of the automobile to withdraw the shafts 11 from contact with the driven impellers S so that the engine may be completely disengaged from the shafts 5–A. Thus a control (not shown) similar to the clutch of a conventional automobile may, through well known linkages (not shown), withdraw the rods 16 so the engine may be run at high speed, as when warming it up, without the engine tending to drive the vehicle through the impellers F and S. A seal 14 extends about the shaft 11 to prevent the hydraulic fluid within each casing 10–B from leaking.

Figure 3:
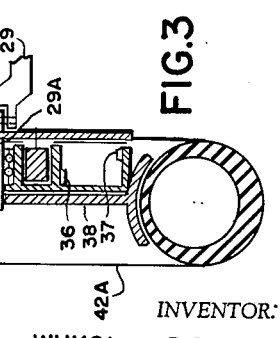
FIG. 3 is a vertical section taken on line 3—3 of FIG. 1 showing the drive mechanism extending from the engine to one driven wheel.

Referring now to FIGS. 1 and 3, it may be seen that each shaft 5–A terminates in a splined section 5–B which carries slidably mounted thereon a pinion gear 35. If the engine directly drives the front wheels as shown in FIG. 1, the shaft 5–A would be broken by the universal joint 12 so that the wheels may be steered. Naturally this universal joint would be located in the axis of the steering knuckle 39. A front axle 29 supports the steering knuckle 39 from which there extends the wheel bearing axle 29–A. A ball or roller bearing 33 supports the wheel drum 40. The brake shoes 34 extend in one circular groove within the wheel drum while the pinion gear 35 extends within another circular groove within the wheel drum. The shield 41 is mounted on the axle 29–A and does not rotate with the wheel. An outer ring gear 36 and an inner ring gear 37 are mounted within the wheel drum to be engaged by the pinion 35 when held in either an extended or retracted position by its collar. The pinion 35 will engage the smaller diameter ring gear 36 to drive the automobile in a forward direction to take advantage of the resulting higher gear ratio. The larger diameter internal gear 37 will be engaged when the pinion 35 is withdrawn so that, when the vehicle is being driven in reverse, a lower gear ratio will result. The wheel disk 38 is bolted on the wheel drum in a conventional manner and carries on a rim the tire 42–A.

Referring now to FIG. 12, it may be seen that the engine is mounted across the frame 28. A starter 32 and generator 31 are shown mounted above the engine so that the starter 32 may engage the ring gear 86 on the fly wheel 6–A and so that the generator 31 may be driven by the pulley 17 on the crankshaft 5 as shown in FIG. 1. In addition, the ignition distributor 88 is shown mounted as it would be turned by the disk 7 as shown in FIG. 4. In a like manner, an oil pump 27 is mounted above the engine to be turned as was the ignition distributor by the other disk 7. A carburetor and air filter 25 is mounted on the intake manifold 73 which leads to the intake apertures 1–A, 2–A, 3–A and 4–A. As shown in FIG. 15, the axle 29 is supported below the frame and the engine by means of the front leaf spring 30. FIG. 16, a transverse section through the engine, shows additional details of its construction.

FIGS. 11, 12, 13 and 14 show the suspension of the fluid drive unit for the rear wheels. The driven shaft 46 extends from the center of the engine rearwardly through two universals 45 and 46–A until it reaches the housing 48 of the rear fluid drive assembly. Mounted on the end of the shaft 46 which extends into the housing 48 is a bevel gear 49 which drives the bevel gear 50. The bevel gear 50 drives the two impellers 51 which are mounted on each side of it on shaft 47. Two axle housings 53 extend into each side of the rear fluid drive assembly housing 48 and are attached to it by means of the ball and socket joints 61 as shown in FIG. 13. Within the inner and outer ends of each axle housing there is a roller bearing 57 which supports the axle shafts 52. Each axle shaft 52 has fixed to its inner end a driven impeller 51–A. The coil spring 56 keeps an oil seal 58 in position to keep hydraulic fluid from leaking out of the rear fluid drive assembly housing. A fluid tight fabric covering 64 extends from the housing outward to the axle housing 53 to further assist in preventing any leakage of hydraulic fluid from within the rear drive assembly. The rear wheels, not shown, are mounted on the ends of the axles 52.

This rear fluid drive unit is sprung and mounted to the frame along with the axles in a unique manner. Since the rear fluid drive unit may be reasonably heavy, it is supported between the side members 28 of the frame by means of the leaf spring 54. The outer portions of the axle housing 53 are supported beneath the side member 28 of the frame by means of coil springs 55. This unique suspension prevents severe road shock from being transmitted either to the frame and thus the body of the automobile or to the rear fluid drive assembly. Should one or both wheels encounter a bump, the coil springs 55 will be compressed to urge the frame 28 of the automobile upward. However, the additional mass of the rear fluid drive assembly need not be urged immediately upward with frame 28 as spring 54 will deflect to allow the frame to reach a new state of equilibrium before the rear fluid drive assembly is drawn upward to assume its original relative position. Therefore, since shocks encountered by the wheels need only be transmitted to the frame 28 through the springs 55 and need not be transmitted directly to the rear fluid drive assembly 48, the springs 55 may be made more resilient to result in a smoother ride.

Although I have shown and described many aspects of my invention, they all contribute toward its main object which is the production of a superior motor car. My automobile could not be built unless the transversely mounted engine had a central power take-off and unless the engine was particularly light in its construction. This lightness of construction is only possible because I have done away with the need for any liquid cooling and for the additional weight of a cam shaft and its associated mechanism. Also, I have achieved a unique four wheel fluid drive which is far lighter than any heretofore constructed. My rear fluid drive assembly has done away with the need for a conventional differential gear system. In ice or mud, all four of my wheels will achieve a positive traction which cannot be achieved by conventional four wheel drive units. In addition, my unique suspension of the rear wheel fluid drive unit keeps sufficient weight on the rear wheels to maintain traction while leaving the frame gently sprung to insure smoother riding qualities.

While I have disclosed my invention in the best form known to me, it will nevertheless be understood that this is purely exemplary and that modifications in the construction, arrangement and combination of parts may be made without departing from the spirit of the invention, except as it may be more particularly limited in the appended claims wherein I claim:

1. A four wheel drive automobile comprising, in combination, a frame, four wheels sprung from and below said frame, an engine crankcase mounted across said frame, a crankshaft journaled within said crankcase, associated internal combustion engine elements mounted in said crankcase to turn said crankshaft, a flywheel fixed to each end of said crankshaft with each flywheel carrying vanes to direct an air blast to cool said associated internal combustion engine elements, a hydraulic drive unit at each end of said crankshaft beyond said flywheels driving a wheel of said automobile, a drive shaft extending from the center of said crankcase, a system of gears one of which is mounted on the center of said crankshaft to turn said drive shaft, and a fluid drive unit attached to said frame opposite said engine, driven by said drive shaft and driving the two other wheels of said automobile.

2. The combination according to claim 1 with the addition of a lateral leaf spring extending across said frame and supporting said fluid drive unit beneath it, a pivotally mounted axle extending outward from each side of said fluid drive unit and having the vehicle wheel driven by said fluid drive unit mounted on each axle beyond said frame, said axles being driven by said fluid drive unit, and coil springs extending upward from said axles near their outwardly disposed ends to said frame supporting said frame.

3. The combination according to claim 2 wherein said fluid drive unit consists of an oil tight housing, a driven shaft journaled within said housing, a bevel gear mounted on said driven shaft, a second bevel gear mounted on the end of said drive shaft to turn said bevel gear and said driven shaft, an outward facing impeller mounted on each end of said driven shaft, and an inwardly facing impeller mounted on the inner end of each of said axles, said impellers mounted on said axles being in close proximity to said impellers mounted on said driven shaft so that, as said drive shaft rotates said driven shaft and said outward facing impellers, said axles will be driven by means of said inwardly facing impellers.

4. The combination according to claim 3 wherein said associated internal combustion engine elements mounted in said crankcase to turn said crankshaft comprise two cylinder blocks, pistons reciprocated within said cylinder blocks by said crankshaft, cam disks mounted directly on said crankshaft, push rods activated by said cam disks, intake and exhaust valves associated with said cylinder blocks, rocker arms actuating said valves, and means requiring two impulses from each of said push rods to activate each rocker arm and thereby a valve.

5. The combination according to claim 4 wherein said means requiring two impulses from each of said push rods to activate one of said rocker arms comprises a rotatably mounted timing cam having four notches in said timing cam which are contacted by said push rod on each reciprocation of said push rod to rotate said cam through at least 45 degrees, a first pair of cam projections disposed on opposite sides of said timing cam to actuate a corresponding one of said rocker arms, a second pair of cam projections axially offset from said first pair of cam projections, and disposed on opposite sides of said timing cam 90 degrees from said first pair of cam projections and actauting a second one of said rocker arms, and spring means urging said rocker arms downward on said cam projections rotating said timing cams through 45 degrees after said timing cam is rotated through 45 degrees by said push rod.

6. The combination according to claim 3 with the addition of means to disengage said drive shaft, and means to disengage the wheels which are directly driven by said hydraulic drive units.

7. A four wheel drive automobile comprising, in combination, a frame, four wheels sprung below said frame, an engine crankcase mounted across said frame, two of said wheels being sprung near the ends of said crankcase and containing inwardly facing grooves, a crankshaft journaled within said crankcase, associated internal combustion elements mounted in said crankcase to turn said crankshaft, a flywheel fixed to each end of said crankshaft with each flywheel carrying vanes to direct an air blast to cool said associated internal combustion engine elements, two drive shafts extending from each end of said crankcase beyond said crankshaft, a hydraulic drive unit at each end of said crankshaft beyond said flywheels turning said drive shafts, an internal and an external ring gear one to the side of the other in the groove contained by each of said two wheels sprung near the ends of said crankcase, pinions slidably mounted on said drive shafts extending from the ends of said crankcase, means to slide said pinions on said drive shafts to selectively engage said external ring gear in forward speeds and said internal ring gear in reverse, a longitudinal drive shaft extending from the center of said crankcase, a system of gears one of which is mounted on the center of said crankshaft to turn said longitudinal drive shaft extending from the center of said crankcase, a fluid drive unit attached to said frame opposite said engine and driven by said longitudinal drive shaft extending from the center of said crankcase and driving the other two wheels of said automobile, and means to disengage said longitudinal drive shaft extending from the center of said crankcase from said crankshaft.

8. The combination according to claim 7 with the addition of means to disengage said drive shafts extending from the ends of said crankcase from said hydraulic drive units.

References Cited in the file of this patent

UNITED STATES PATENTS

| 2,039,210 | Bugatti | Apr. 28, 1936 |
| 2,065,598 | McCoy | Dec. 29, 1936 |
| 2,310,513 | Burns | Feb. 9, 1943 |
| 2,335,544 | Schnetzer | Nov. 30, 1943 |

FOREIGN PATENTS

| 185,018 | Switzerland | Sept. 16, 1936 |
| 654,326 | Germany | Dec. 18, 1937 |